(12) United States Patent
Kuzmin et al.

(10) Patent No.: US 8,674,701 B2
(45) Date of Patent: *Mar. 18, 2014

(54) AIRBORNE ELECTROMAGNETIC TRANSMITTER COIL SYSTEM

(75) Inventors: Petr Valentinovich Kuzmin, Aurora (CA); Edward Beverly Morrison, King (CA)

(73) Assignee: Geotech Airborne Limited, St. Michael (BB)

( * ) Notice: Subject to any disclaimer, the term of this patent is extended or adjusted under 35 U.S.C. 154(b) by 585 days.

This patent is subject to a terminal disclaimer.

(21) Appl. No.: 12/919,332

(22) PCT Filed: Feb. 25, 2009

(86) PCT No.: PCT/CA2009/000217
§ 371 (c)(1),
(2), (4) Date: Aug. 25, 2010

(87) PCT Pub. No.: WO2009/105873
PCT Pub. Date: Sep. 3, 2009

(65) Prior Publication Data
US 2011/0001480 A1    Jan. 6, 2011

Related U.S. Application Data

(63) Continuation-in-part of application No. 12/036,657, filed on Feb. 25, 2008, now Pat. No. 7,948,237.

(51) Int. Cl.
*G01V 3/16* (2006.01)

(52) U.S. Cl.
USPC .......................................... 324/330; 324/331

(58) Field of Classification Search
None
See application file for complete search history.

(56) References Cited

U.S. PATENT DOCUMENTS

| | | | |
|---|---|---|---|
| 4,628,266 A | 12/1986 | Dzwinel | |
| 4,641,100 A | 2/1987 | Dzwinel | |
| 6,244,534 B1 | 6/2001 | Klinkert | |
| 2005/0001622 A1* | 1/2005 | Morrison et al. | 324/330 |
| 2008/0211506 A1 | 9/2008 | Klinkert | |
| 2009/0212778 A1* | 8/2009 | Kuzmin et al. | 324/330 |
| 2011/0272522 A1* | 11/2011 | Kuzmin et al. | 244/1 TD |

FOREIGN PATENT DOCUMENTS

| | | |
|---|---|---|
| CA | 2187952 A1 | 4/1998 |
| CA | 2450155 | 5/2004 |
| WO | 2004-046761 A1 | 6/2004 |
| WO | 2005106536 | 11/2005 |

OTHER PUBLICATIONS

International Search Report from PCT/CA2009/000217; dated Jun. 17, 2009.

(Continued)

*Primary Examiner* — Minh N Tang
(74) *Attorney, Agent, or Firm* — Novak Druce Connolly Bove + Quigg LLP

(57) ABSTRACT

A tow assembly for an airborne electromagnetic surveying system including a semi-rigid transmitter coil frame supporting a transmitter coil, the transmitter coil frame being formed from a plurality of serially connected frame sections forming a loop, the transmitter coil frame having articulating joints at a plurality of locations about a circumference thereof enabling the transmitter coil frame to at least partially bend at the articulating joints; and a suspension assembly for towing the transmitter coil frame behind an aircraft, the suspension assembly comprising a plurality of ropes and attached to the circumference of the transmitter coil frame at spaced apart locations.

9 Claims, 8 Drawing Sheets

(56) References Cited

OTHER PUBLICATIONS

European Search Report issued on Mar. 3, 2011 in the corresponding European Patent Application No. 09714643.5-1240/2247966.
"Airborne EM Applied to Sulphide Nickel—Examples and Analysis" Peter Wolfgram, Howard Golden; Key word "Airborne electromagnetic, Nickel Sulphide", 2001, vol. 32, No. 3 & 4; 5 pages.
"Newtem—A novel time-domain helicopter electromagnetic system for resistivity mapping" Perry Eaton, Bob Anderson, Bruno Nilsson, Eric Lauritsen, Steve Queen, Colin Barnett; Newmont Mining Corporation, Englewood, USA, Oct. 6-11, 2002; downloaded Oct. 13, 2010; 4 pages.
01-01 "60 Years of Airborne EM—Focus on the Last Decade" David Fountain, Formerly Fugro Airborne Surveys, Ottawa, Canada, May 30, 2008; 12 pages.
"Aerotem*: System Characteristics and Field Results" Paper presented at a Special Session on "New EM Methods" at the 2000 Annual Meeting of the Society of Exploration Geophysicists, Aug. 6-11, 2000 in Calgary, Alta.: Boyko, W. (1), Peterson, N.R.(2), and Kwan, K.(3); 15 pages.
"Mineral Exploration With the Aero TEM System" S.J.Balch*, W.P. Boyko, G. Black, and R.N. Pedersen, AeroQuest Limited, Oct. 6-11, 2002; downloaded Oct. 13, 2010; 4 pages.
"Aero TEM Characteristics and Field Results" W. Boyko, AeroQuest Limited, Mississauga, Ontario, Canada; N.R. Paterson and K. Kwan, Paterson, Grant, and Watson Limited, Toronto, Ontario, Canada, Oct. 2001; downloaded Oct. 13, 2010; 5 pages.
"Normandy Heli-Borne Time Domain EM System" Graham Boyd; Normandy Exploration: Australia, Aug. 2001; 1 page.
Canadian Office Action issued on Sep. 16, 2010 in Canadian Patent Application No. 2,702,346.
Extended European Search Report issued on Mar. 3, 2011 in PCT Application No, PCT/CA2009/000217.
Notification of Transmittal of the International Search Report and the Written Opinion of the International Searching Authority, or the Declaration for PCT/CA2009/000217, dated Jun. 17, 2009, 15 pages.
Non-Final Office Action for corresponding U.S. Appl. No. 13/113,582, dated Jun. 19, 2013; 12 pages.

\* cited by examiner

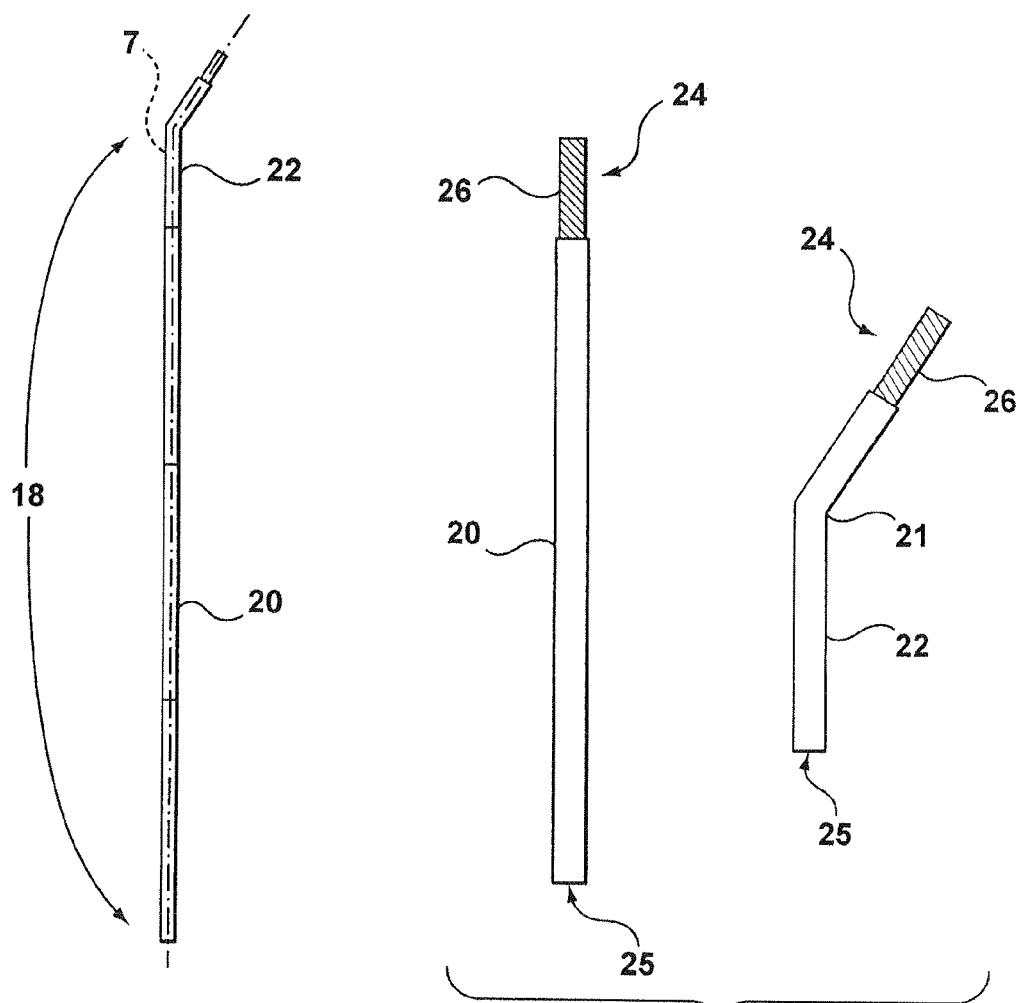

AIRBORNE ELECTROMAGNETIC TRANSMITTER COIL SYSTEM

This application is a National Stage of, and claims the benefit of, International Application No. PCT/CA2009/000217 on Feb. 25, 2009, which is a Continuation in Part of U.S. application Ser. No. 12/036,657 filed on Feb. 25, 2008 now U.S. Pat. No. 7,948,237, the contents of each being hereby incorporated herein by reference in their entirety.

FIELD

This disclosure relates in general to transmitter coil systems used in the field of airborne geological mapping.

BACKGROUND

There are a variety of known electromagnetic techniques. Geophysical electromagnetic ("EM") techniques can be effective in determining the electrical conductivity of soils, rocks and other conductive material at depths up to about one kilometer. Conductivity distribution with depth is of great interest in mapping base metals and uranium deposits, aquifers and other geological formations. Active geophysical EM methods generally involve generation of a magnetic field by applying a periodic current to a transmitter coil system placed near the earth's surface. This primary magnetic field induces electrical currents in the ground, and the secondary magnetic field produced by these currents is measured to provide information about ground conductivity distributions.

The secondary magnetic field signal may be measured using either a receiver coil system (which can measure up to three orthogonal components of the magnetic field time derivative dB/dt), or a magnetometer (which measures the magnetic field B). The received analog signal may then be amplified, filtered, and digitized by a high-resolution high-speed analog-to-digital converter ("ADC"), and the data may be stored along with positioning information obtained from a Global Positioning System ("GPS"). Data post-processing can involve electrical and physical modeling of the ground to generate the geophysical conductivity contour maps.

EM measurements can be done either in the frequency domain or time domain. In frequency-domain electromagnetic ("FDEM") measurements, the transmitter coil generally continuously transmits an electromagnetic signal at fixed multiple frequencies, while the receiver coil may measure the signal as a function of time. The measured quantities may include either signal amplitude and phase, or equivalently, the in-phase and in-quadrature amplitudes as a function of frequency.

In time-domain electromagnetic ("TDEM") systems, a pulse of current may be applied to the transmitter coil during an on-period, generating the primary or transmitted EM field, and then switched off during an off period. The secondary signal may be measured at the receiver coil as a function of time. The signal amplitude decay during the off-period, combined with modeling of the conductivity and geometry of geological bodies in the ground, may be utilized to yield conductivity contour maps. U.S. Pat. No. 7,157,914 shows an example of a TDEM system.

EM methods can encompass both ground-based and airborne applications using airplanes and helicopters. Airborne methods may be convenient for large area surveys and have been used for exploration of conductive ore bodies buried in resistive bedrock, geological mapping, hydrogeology, and environmental monitoring. By way of non-limiting example, in some airborne electromagnetic ("AEM") systems, the data may be acquired while the airplane or helicopter flies at nearly constant speed (for example, up to 75 m/s or 30 m/s, respectively) along nearly parallel equally spaced lines (for example, 50 m to 200 m) at close to constant height above ground (for example about 120 m or 30 m, respectively). Measurements can be taken at regular intervals, for example in the range 1 m up to 100 m.

In designing a helicopter mounted time-domain electromagnetic ("HTEM") system, there are a number of desired features including: high signal-to-noise ratio ("SNR"), high conductance discrimination, and high spatial resolution both laterally and in depth. High signal-to-noise ration can be accomplished by lowering system noise, or by increasing the signal at the receiver coil. One method of increasing the signal means may be increasing the primary magnetic field.

For a point far away from the transmitter coil, the magnetic field is proportional to the magnetic dipole moment of the coil and inversely proportional to the cube of the distance from the coil. The magnetic dipole moment of a coil is the product of $N*I*A$ where N is the number of turns, I is the current, and A is the coil area. The inductance of a coil is proportional to $N^2 \times D$, where N is the number of turns and D is the diameter of the coil. The voltage induced in the receiver coil by a magnetic field B is given by $N*A*dB/dt$, where the coil sensitivity $N \times A$ is the product of the coil number of turns N and the coil area A, and dB/dt is the time-derivative of the magnetic field.

Whenever the survey objective is to map near surface conductivity, a small magnetic dipole moment with fast turn-off may be appropriate, in which case the number of turns in the transmitter coil is generally smaller, thus yielding a reduced magnetic dipole moment and inductance. Conversely, for the detection of conductors at greater depths, it may be desirable to have a longer off-period, and more importantly, to increase the transmitter coil magnetic dipole moment.

Whenever an increase in the magnetic dipole moment may be warranted, it is necessary to increase either the current I, the number of turns N, or the area of the transmitter coil A. The electrical power supply from a single engine helicopter may be limited by the helicopter generator unless an auxiliary power supply is used. Also, a limiting factor for the amount of current in the transmitter coil is the electrical resistance of the coil and tow cable. For a fixed-length of cable, the power, P, from the helicopter electrical supply is dissipated approximately as the square of the current times the resistance ($P=I*I*R$). Decreasing the resistance will increase the current by the square root of the decrease. Decreasing the resistance in the loop may be accomplished by heavier gauge wire with its corresponding increase in weight as the electrical resistance is approximately proportional to the length times the resistivity divided by the cross sectional area of the wire. The weight of the transmitter coil is also proportional to the length of the cable, and therefore is proportional to the number of turns N or the square root of the transmitter coil area A. Since the weight of the transmitter coils increases as the square of the current I, and linearly with the number of turns N, and as the square root of the area A, for a given towing weight capacity of the helicopter, the one way to increase the magnetic dipole moment of the transmitter coil may be to increase the area A. Another factor to consider when optimizing the transmitter coil I, N, and A is the requirement of a short turn-off time in time-domain measurements, which can require a low inductance of the transmitter coil, the inductance being proportional to the square of N and to the square root of the transmitter coil area.

However, increasing the transmitter coil diameter may reduce aerodynamics and increase drag. Large structures may be stressed during take-off and landing, and therefore there is generally a limit for the size of rigid structures that can be deployed without breaking apart. Reinforcing the structure so that it does not break during take-off and landings may mean an increase in the weight of the structure. Additionally, maintaining the transmitter coil shape during flight can be very important to provide a fixed magnetic dipole moment, in order not to degrade the quality of the measurements. Thus, the requirement for an increased magnetic dipole moment can require careful balancing of many factors.

SUMMARY

According to one example embodiment is a tow assembly for an airborne electromagnetic surveying system, comprising: a semi-rigid transmitter coil frame supporting a transmitter coil, the transmitter coil frame being formed from a plurality of serially connected frame sections forming a loop, the transmitter coil frame having articulating joints at a plurality of locations about a circumference thereof enabling the transmitter coil frame to at least partially bend at the articulating joints; and a suspension assembly for towing the transmitter coil frame behind an aircraft, the suspension assembly comprising a plurality of ropes and attached to the circumference of the transmitter coil frame at spaced apart locations.

According to another example embodiment is a method for providing a tow assembly for an airborne electromagnetic surveying system, comprising: providing a transmitter coil; providing a plurality of tubular frame members; serially connecting the plurality of tubular frame members in a loop to form a transmitter coil frame that supports the transmitter coil, with joints between at least some of the tubular frame members permitting rotational movement enabling the transmitter coil frame to at least partially bend in response to forces provided against the transmitter coil support frame; providing a suspension assembly for towing the transmitter support frame behind a helicopter and connecting the suspension assembly at multiple locations about the transmitter coil frame.

In one aspect of the invention, an airborne time domain electromagnetic surveying system is disclosed comprising: a tow assembly for connection to an aircraft, the tow assembly including: a support frame including; a transmitter section including a transmitter means, the transmitter section including generally semi-rigid modular support structure for supporting the transmitter means; and a receiver section including a receiver support frame and a sensor means.

In another aspect of the invention, an airborne time domain electromagnetic surveying transmitter coil is disclosed, comprising: a transmitter section including: a transmitter coil; and a semi-rigid modular support structure; wherein for the semi-rigid modular support structure supports the transmitter coil; and a tow assembly for connection to an aircraft including a support frame; and wherein the transmitter section is included in the support frame; and wherein the structure of the support frame enables the positioning of the support frame in a substantially horizontal position in flight and the augmentation of the magnetic dipole moment.

In yet another aspect of the invention, a suspension net apparatus for suspending an electromagnetic surveying transmitter coil is disclosed, comprising: a suspension net having a tow rope connection operable to attach to an aircraft, the suspension net having a plurality of ropes attached to a semi-rigid modular structure by way of a plurality of attachment points between the plurality of ropes; and a transmitter coil for acquiring surveying data the transmitter coil being attached to the suspension net at the tow rope connection; wherein the distance between the attachment points and the length of the ropes is defined so as to provide substantially horizontal positioning of the transmitter coil in flight; and wherein the semi-rigid modular structure includes a transmitter support frame supporting the transmitter coil and having a plurality of transmitter support frame sections interconnected so that each transmitter support frame section may rotate relative to the adjacent sections about its axis.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

FIG. 2 is a plan view showing one side of the transmitter coil frame of the tow assembly of FIG. 1.

FIG. 3 is a plan view of components of the side of the transmitter coil frame.

Figure 1:
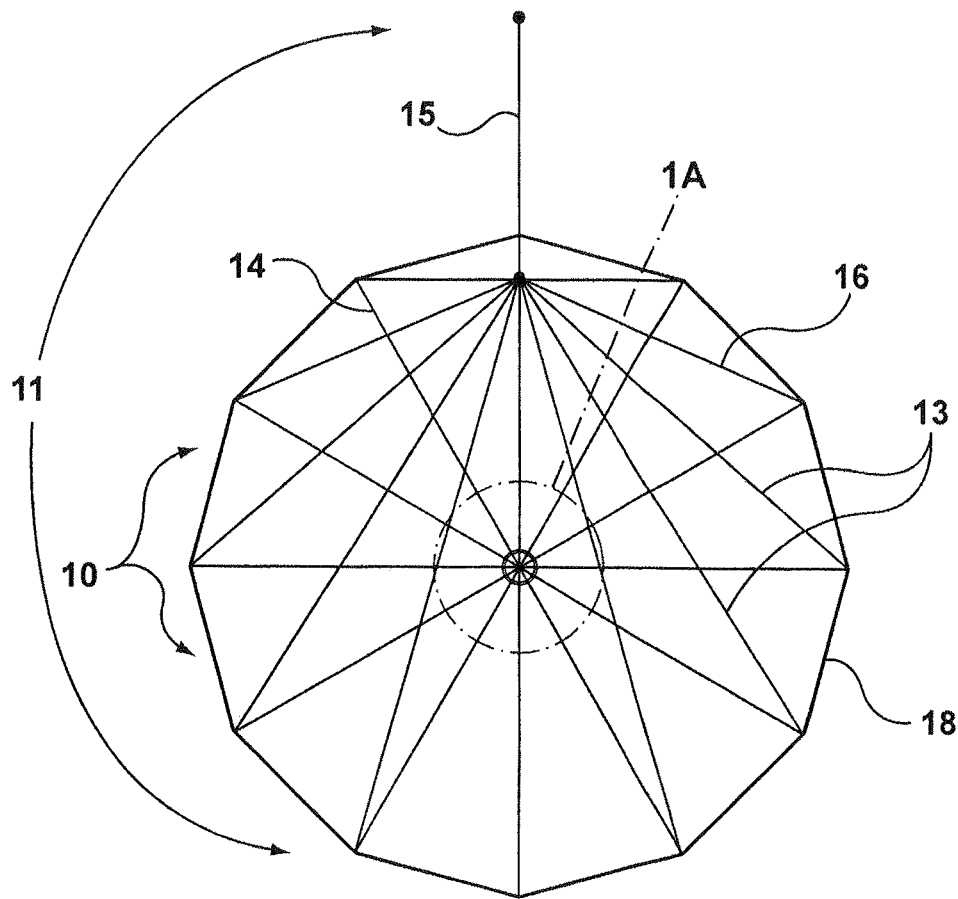
FIG. 1 is a top perspective view of a tow assembly that includes a transmitter coil frame and receiver coil frame, according to an example embodiment of the invention.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

Example embodiments of the present invention relate to a large transmitter coil which can be deployed by an aircraft, such as but not limited to a single engine helicopter, and which may be used in a time-domain electromagnetic system such as an airborne HTEM survey system. There is a need for a transmitter coil in the field of electromagnetic surveying systems having particular features such as size scalability, and a transmitter coil support structure that is repairable in the field. In at least some example embodiments, a tow assembly has a transmitter coil support structure that is a semi-rigid structure that reduces the likelihood of breakage when it is flown from an aircraft, such as a low-cost small-engine helicopter, for example. Moreover, the transmitter coil support structure may be formed of sections whereby it can be repaired in the field and allow for scalable size of the structure.

The airborne tow assembly system and apparatus of at least some example embodiments of the present invention may be of use in exploring base metals and uranium deposits at depths of a certain distance for example those in the range of 1 kilometer, as well as other depths. In some example embodiments, the tow assembly may have one or more of the following features: it may include a transmitter coil having a large magnetic dipole moment; it may provide flight stability; it may be light-weight and therefore compatible with small aircraft, such as single-engine helicopters; it may be easily transported, set-up and repaired in the field. The transmitter coil frame assembly in accordance with example embodiments of the invention may include a semi-rigid modular structure that can decrease the incidence of damage or breakage during take-off or landing.

Furthermore, some example embodiments may include a large transmitter coil which can be deployed by a small aircraft, such as a single-engine helicopter and which provides for a high signal-to-noise ratio ("SNR") receiver coil.

In one embodiment, the transmitter coil frame comprises a semi-rigid modular structure comprised of electrically-insulating polygonal tubes having self-lubricating joints, and a rope suspension system. A receiver coil may be attached centrally in the transmitter coil frame having a separate mesh rope suspension system.

Different embodiments of the invention are possible having varying frame structures comprising a range of configurations, positioning of coils, sizes, materials and weights.

Figure 4:
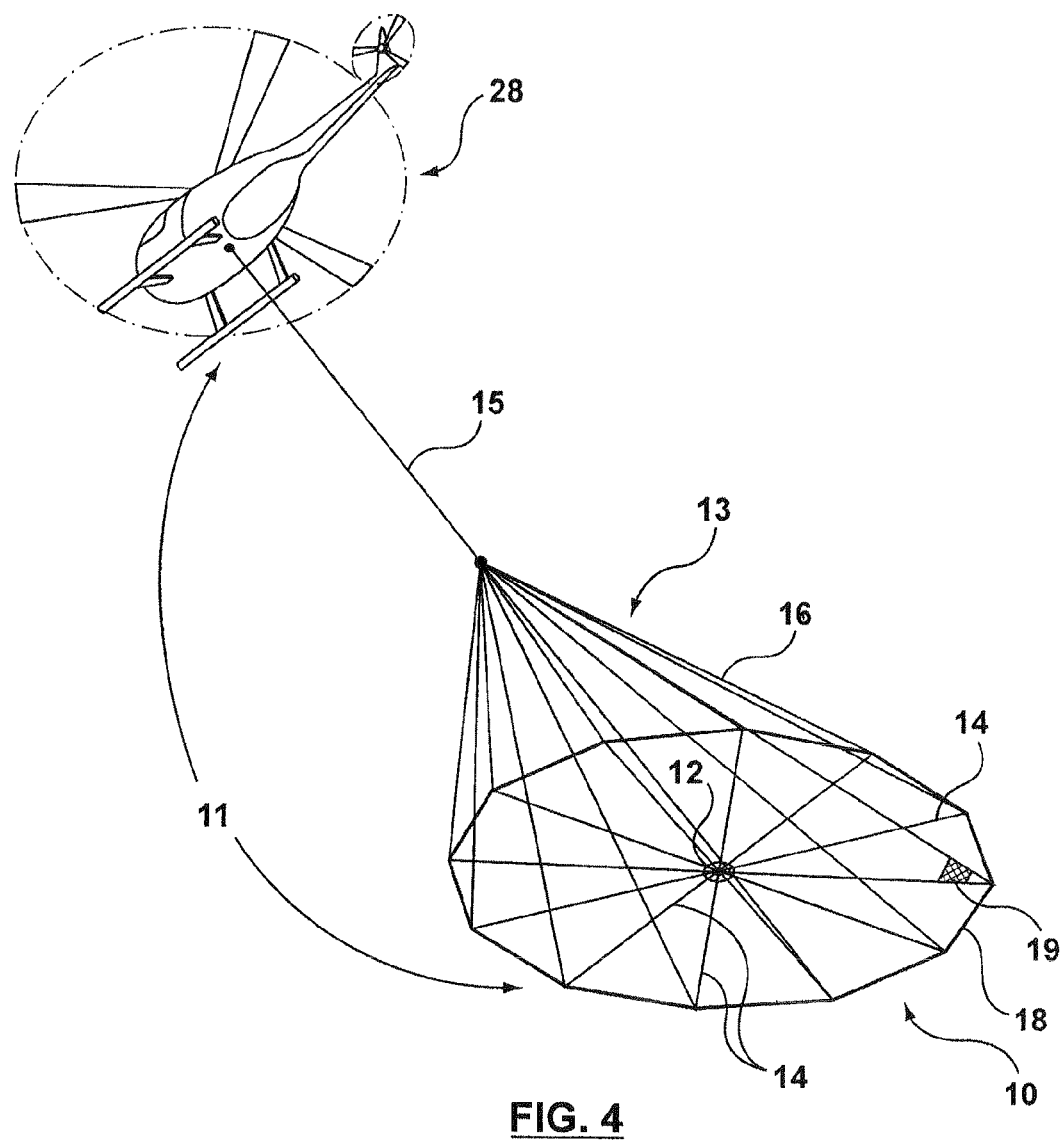
FIG. 4 is a perspective view of the transmitter coil frame and the receiver coil frame in an airborne position flying at survey speeds.

FIGS. 1 and 4 show a tow assembly for airborne electromagnetic surveying according to example embodiments of the invention. As shown in FIGS. 1 and 4, the tow assembly includes a transmitter coil frame 10 that is a polygon, such as a dodecagon, built from tubes 18 constructed of glass fiber, Kevlar or other suitable light-weight and durable materials capable of electrical-insulation. A polygonal receiver coil frame 12 which may for example be octagonal in shape, sits at the centre of the transmitter coil frame 10. The two frames may be connected by a radial system of ropes 14. In the illustrated embodiment the ropes 14 extend radially outward under tension from a common central hub 9 to respective locations that are evenly spaced about the perimeter or circumference of the transmitter coil frame 10. The receiver coil frame 12 is attached to and supported by the ropes 14 concentric with the transmitter coil frame 10. U.S. Pat. No. 7,157,914 (the contents of which are incorporated herein by reference) describes one suitable example of how a radial system of ropes can be used to connect a transmitter coil frame and support a receiver coil frame.

Both coil frames 10, 12 may be suspended in a near horizontal position by a suspension system 11 that is attached to the polygonal transmitter coil frame 10. The suspension system 11 that is connected to the transmitter coil support frame 10 includes a tow rope attachment suspension cable 15, which may be attached to an aircraft for the purpose of suspending the transmitter coil frame 10 in an airborne position. A lower end of the tow rope attachment suspension cable 15 is connected to a support rope assembly 13 that in turn is connected to multiple pick up points about the circumference of the transmitter coil frame 10.

Figure 8B:
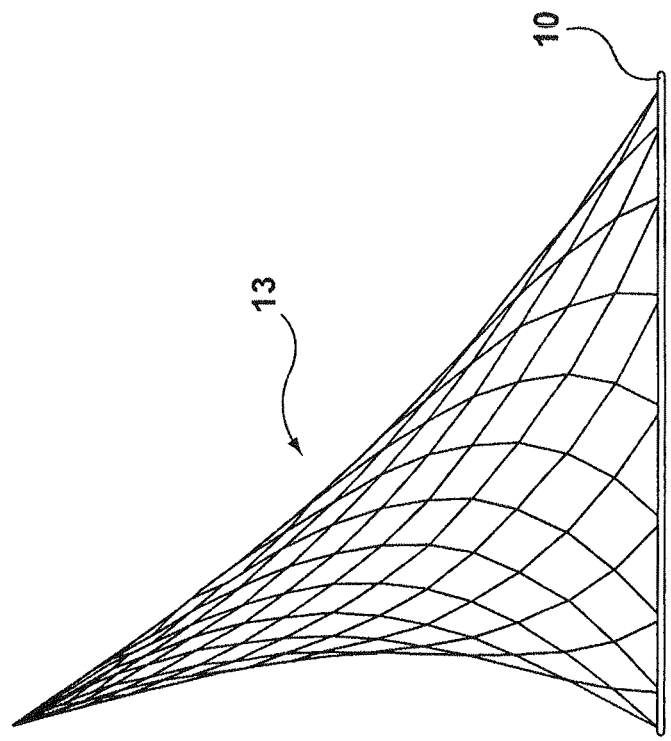
FIGS. 8A and 8B are bottom and side views respectively showing a suspension net support for the transmitter coil frame according to another example embodiment.
Figure 8A:
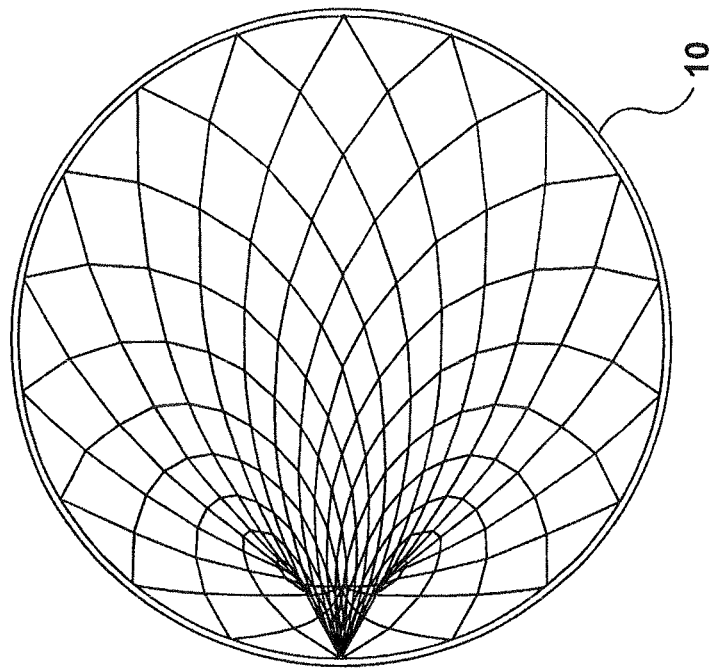

In the embodiment illustrated in FIGS. 1 and 4, the support rope assembly 13 includes ropes 16 that each have a lower end attached to a respective pick-up point on the circumference of the transmitter coil frame 10 and an upper end attached to the lower end of tow rope attachment suspension cable 15. In at least some example embodiments, the ropes 16 are each attached to a respective corner of the transmitter coil frame. U.S. Pat. No. 7,157,914 (the contents of which are incorporated herein by reference) describes one suitable example of a support rope assembly 13 that could be used to support the transmitter coil frame 10. In another example embodiment the support rope assembly of suspension system 11 may be constructed of ropes forming a conical mesh or net-like structure such as shown in FIGS. 8A and 8B and described in U.S. patent application Ser. No. 11/610,556 filed on Dec. 14, 2006 and published as US 2008/0143130 (the contents of which are incorporated herein by reference). Other constructions of the suspension system are also possible.

FIG. 2 shows an example of one side 18 of the transmitter coil frame 10, and FIG. 3 shows components of the side 18. As shown in FIGS. 2 and 3, in one embodiment each of the polygon's sides 18 can include straight tubular frame sections 20, and elbow tubular frame sections 22. Tubular frame sections 20 and 22 are serially connected together to form a closed loop. A curve 21, or elbow, in the side 18 may not necessarily be centrally located in the tubular elbow section 22. In the illustrated embodiment, the side 18 includes three serially connected straight tubular sections 20 followed by an elbow tubular section 22. The use of multiple straight tubular sections to provide one side 18 allows the size of the transmitter coil frame 10 to be enlarged by adding straight tubular sections to the sides or reduced by removing straight tubular sections from the sides.

In the embodiment shown in FIG. 3, each of the tubular sections 20 and 22 has an male insert termination tube 24 having an outer diameter 26 protruding at one end, and a female receptacle 25 at the other end such that the sections 20, 22 can be assembled in end to end mating fashion to form the transmitter coil frame. The protruding insert termination tube 24 may be constructed of carbon fiber, lubricated glass fiber or any other material that permits each tubular section 20, 22 to be connected to the female end 25 of an adjacent section in a rotatable manner. When the transmitter coil frame 10 structure is assembled, each tubular section can rotate relative to its adjacent tubular sections about its axis along the side 18 of the polygon. In order to provide or enhance lubrication the protruding insert termination tube 24 may be lubricated with carbon or molybdenum-based spray lubricants, or any other lubricant that allows for the required rotation. In some example embodiments, some tubular sections may have two female ends with alternating tubular sections having two male ends.

In example embodiments, the transmitter coil frame 10 forms a continuous transmitter coil passage that houses a transmitter coil (illustrated by dashed line 7 in FIG. 2). In at least some example embodiments, the transmitter coil 7 is formed from one or more turns (fnr example four turns) of a heavy-duty aluminum electrical wire placed inside tubular pieces 20 and 22, and be connected by heavy-duty copper cables to a power supply located at the aircraft 28 suspending the transmitter coil frame 10 in an airborne position, such as a helicopter. In at least some example embodiments of the transmitter coil frame 10, aluminum cabling can yield a lighter structure having comparable current capacity than alternative conductive materials such as copper. In some embodiments, the total weight of the tow assembly system is of an amount that allows for it to be towed by an aircraft 28, such as a low operating cost small single-engine helicopter.

In one non-limiting example embodiment of the present invention, the transmitter coil 7 may have a maximum current capacity of, for example 250A with a duty-cycle up to 50%. The magnetic dipole moment of the transmitter coil may have a value of, for example 500,000 A·m² and an inductance value of, for example 1.5 mH. The receiver coil may have sensitivity N*A, of, for example 500 m², where N is the number of turns of the wire coil and A is the coil area.

It will be appreciated that the current magnetic dipole moment of the transmitter coil 7 and other features may be altered to accommodate external parameters, such as the maximum power available of the towing aircraft.

Figure 1A:
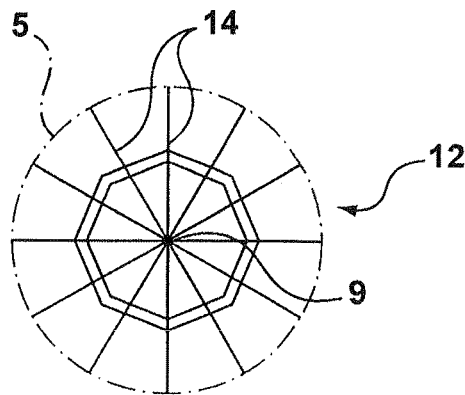
FIG. 1A is an expanded view of the portion 1A of FIG. 1, showing receiver coil frame in greater detail.

The receiver coil frame 12 can also be formed from tubular members that define a continuous internal passage housing a receiver coil 5, as indicated in dashed lines in FIG. 1A. Above mentioned U.S. Pat. No. 7,157,914 describes a suitable example of how a receiver coil can be mounted in receiver coil frame 12.

Figure 5:
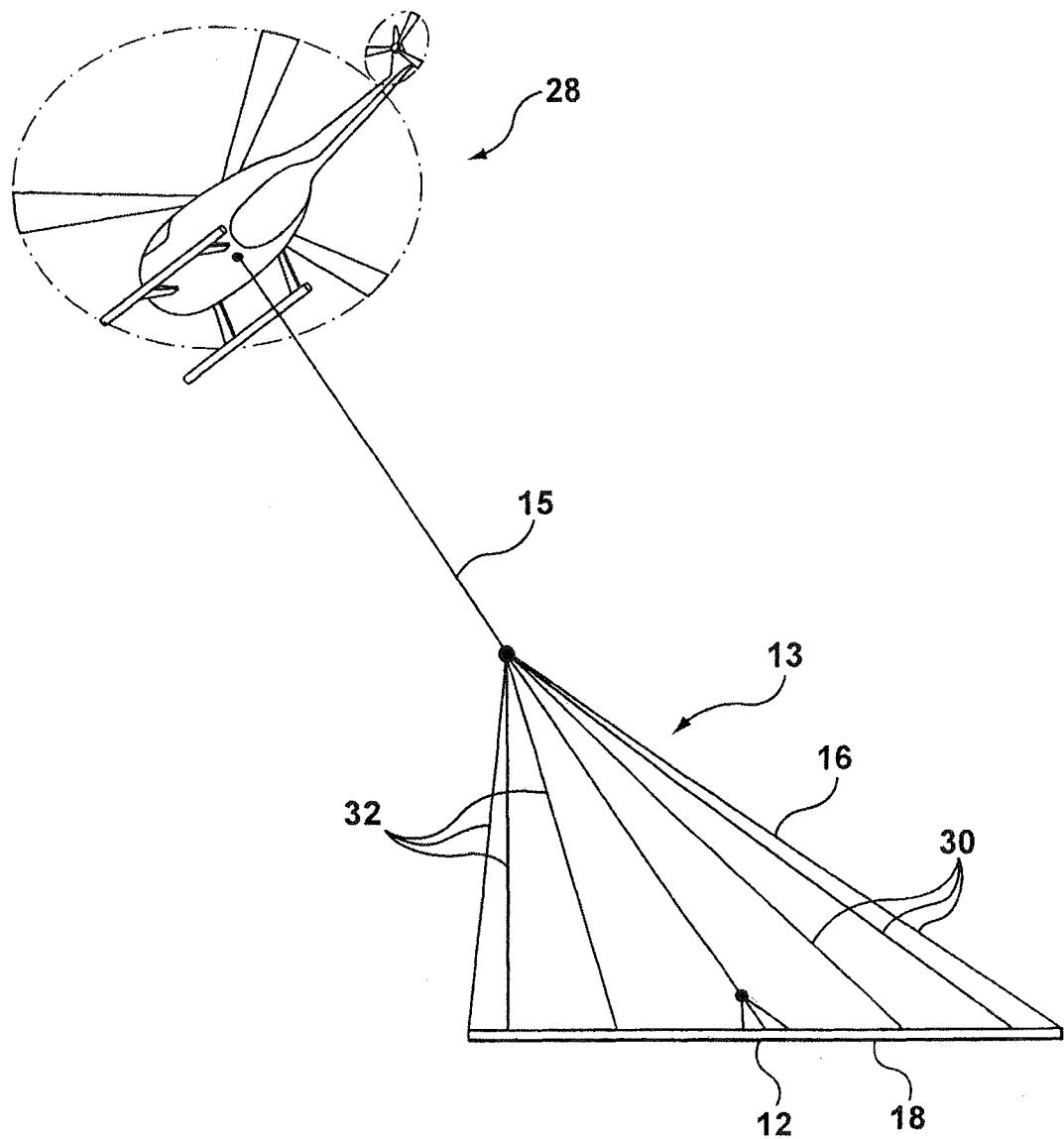
FIG. 5 is a side view of the transmitter coil frame and receiver coil frame in an airborne position flying at surveying speeds.

FIGS. 4 and 5 each illustrate the main transmitter coil frame 10 and receiver coil frame 12 as they are positioned in flight for surveying purposes.

As shown in FIG. 5, in at least some example embodiments the support rope assembly 13 is configured such that when airborne and flying at survey speeds, the main transmitter coil frame 10 and receiver coil frame 12 are positioned in a substantially horizontal position so that the suspension system 11 supports the transmitter coil 7 and receiver coil 5 with there respective dipole axes substantially vertical. The length of each suspension cable or rope 16 may be such that when airborne during a flight the transmitter coil frame 10 and receiver coil frame can be in a substantially horizontal position, with the suspension point located at an angle from the vertical. To achieve this position, longer cables or ropes 30 may be positioned at the back or trailing side of the support rope assembly 13 and shorter cables or ropes 32 at the front or leading side of the support rope assembly 13 of the suspension system 11.

In at least some embodiments, the multi-point suspension system 11 can assist in achieving increased stability to support a desired flight position. Specifically, the multi-point suspension system structure 11 may produce a drag that maintains the transmitter coil frame 10 in a substantially horizontal position. Although the suspension can produce an overall small drag, the longer ropes positioned at the back 30 may produce a more significant drag than the shorter ropes 32 positioned at the front. This can keep the transmitter coil frame 10 at the proper position and prevent it from rotating about its vertical axis. There may also be a small stabilizing aerodynamic fin 19 on the back or trailing side of the tow assembly structure, as shown in FIG. 4, to provide additional stability on turns between survey lines.

In some embodiments, the transmitter coil frame 10 may be of a relatively large diameter, for example measuring more than 25 m in overall size. In some applications, the disclosed mechanical configuration may assist in minimizing wind-induced vibrations, and assist in maintaining transmitter coil shape during flight, which may allow for the maintenance of a stable magnetic dipole moment, and can act to improve the signal-to-noise ratio at the receiver coil.

In the above described embodiments of the invention, the transmitter coil frame 10 is an articulated tubular segmented polygon structure held together and kept stable during flight by the combination of the suspension system 11 and the optimum weight of the electrical cables of the transmitter coil. The tow assembly structure may be designed be heavy enough not to flip up when buffeted by the wind during flight, but light enough to be towed by an aircraft 28, such as a single-engine helicopter. By way of example, a tow assembly may weigh about 500 kg. Moreover, the tubular structures 20 and 22 can be stiff enough such that the structure does not break apart and can withstand the compression forces of the suspension system 11 and the forces applied on this structure when the aircraft 28 is flying. Flight speeds may be by way of non-limiting example from 25 m/s up to 50 m/s.

Figure 6:
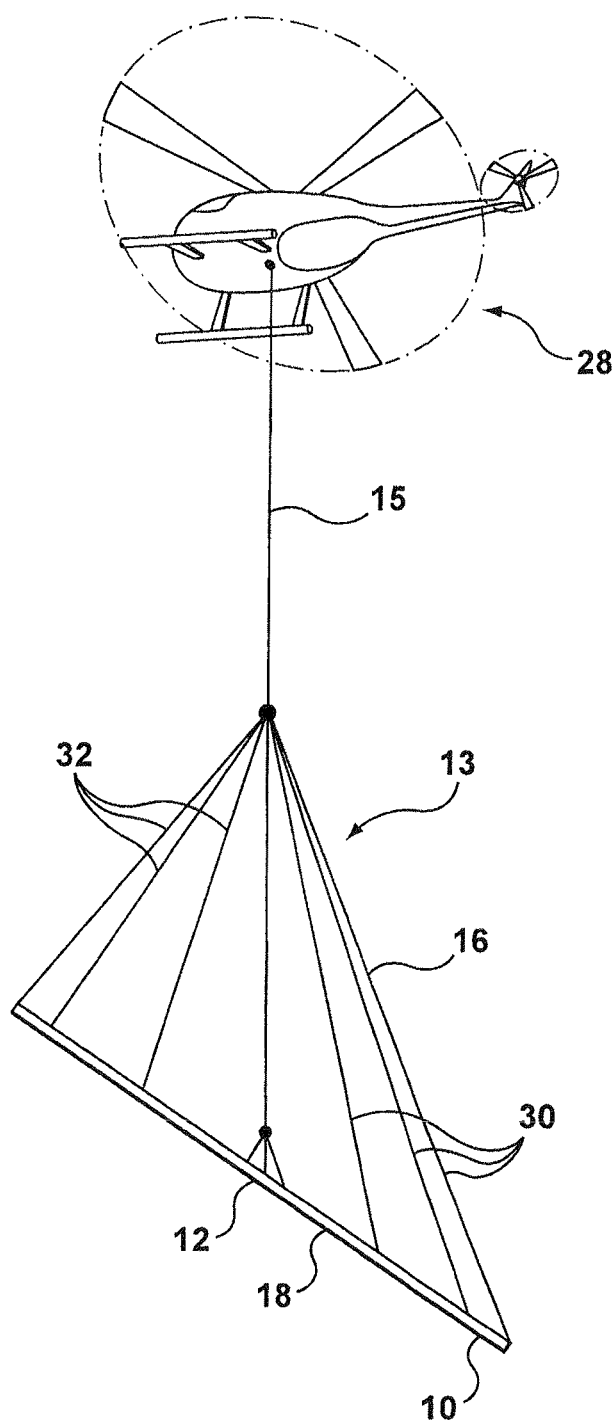
FIG. 6 is a side view of the transmitter coil frame and receiver coil frame in an airborne position at low or no horizontal speed just after take off or before landing.
Figure 7:
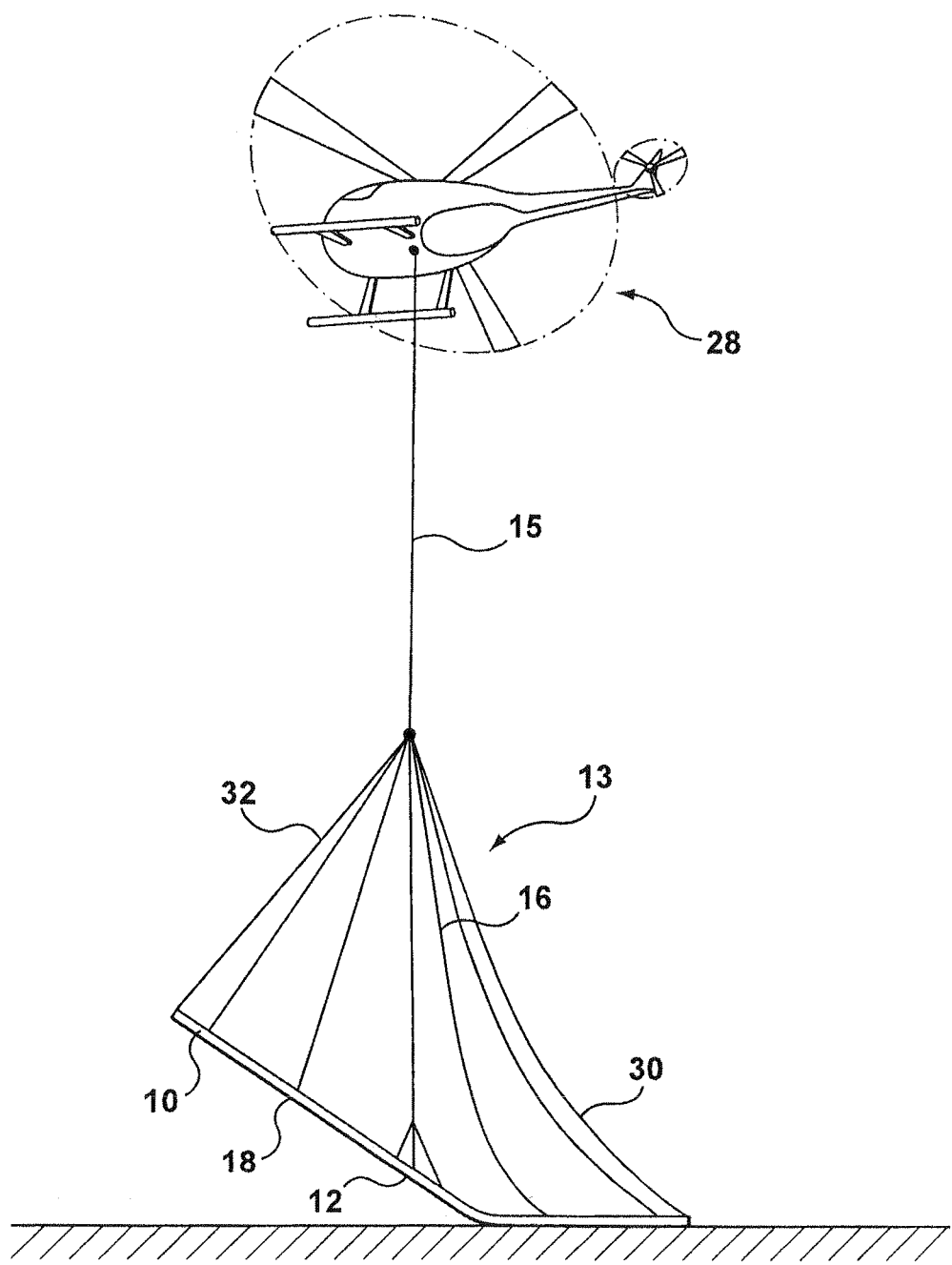
FIG. 7 is a side view of the transmitter coil frame and receiver coil frame in a semi-airborne position during take off or landing when a portion of the frame is in contact with the ground.

FIG. 6 shows the tow assembly and the position of the transmitter coil frame 10 and receiver coil frame 12 that when the aircraft 28, such as a helicopter, is not moving horizontally. This positioning may occur during take-off and landing. In these situations, the transmitter coil frame 10 may not be horizontal with the central axis and rather may be at an angle from the vertical. During landing operations, as the transmitter coil touches the ground, the tubular sections 20 and 22 of the transmitter coil frame 10 may rotate relative to each other. In this regard, FIG. 7 further shows how the tow assembly structure sides 18 can adjust the shape of the semi-rigid transmitter coil frame 10 during landing, by bending the frame at the articulating joints between tubular sections 20, 22 of the transmitter coil frame 10. The "folding" ability of the transmitter coil support frame may have the effect of minimizing stress on the structure.

In at least some applications, the modular semi-rigid transmitter coil frame 10 may have benefits relative to a rigid mechanical structure. For example, a traditional large rigid-frame may build-up mechanical stresses that result in breaks occurring during landing. With a semi-rigid structure rotating around its lubricated joints, the structural stress may be reduced, and the likelihood of a smooth landing can increase. The semi-rigid modular structure also may make it possible to land the transmitter coil on irregular terrain. This can be an important consideration in surveying mountainous or rugged terrain where the helicopter and landing areas may not be located on level ground.

In some example embodiments, the transmitter coil 10 and the receiver coil 12 may be built to a relatively large size, measuring approximately 25 m or more in overall size. The flexibility of the semi-rigid structure, combined with its polygonal shape and sizing for the individual parts which can be selected so that the tow assembly can be disassembled and shipped in standard container, can assist in the building of systems with very large coils that are capable of being assembled in field, and taking off and landing without breaking the structure.

In example embodiment, the modular transmitter coil frame structure may be disassembled. Each of the sides 18 may be comprised of sections 20 and 22 of a length and width that permits transportation or shipping, for example by standard air freight without requiring special handling, so that the components of the transmitter coil frame 10 may be shipped in containers, such as standard airfreight containers, and assembled in the field. If the transmitter coil frame 10 is damaged it can be repaired by replacing damaged pieces in the field.

It will be appreciated by those skilled in the art that other variations of the embodiments described herein may also be practiced without departing from the scope of the invention. Other modifications are therefore possible. For example, the structure can be scaled up to produce larger magnetic dipole moments compatible with the requirements of the specific survey using helicopters with towing capacity larger than single-engine helicopters to achieve probing of ground conductivity at the required depths. Moreover, the transmitter coil structure may be constructed of a variety of materials, as may the suspension system allowing for the tensile strength, lubricated rotatability, and light weight structure described above. Additionally, the structure could be applied to frequency domain electromagnetic survey systems. In some embodiments, the receiver coil or sensor could be located somewhere other than the center of the transmitter coil frame—for example it could be towed behind the transmitter coil frame or located off-center within the circumference of the transmitter coil frame.

Additionally, the transmitter coil frame 10 could be formed from tubular sections that are curved such that the frame 10 is circular rather than a polygonal shape that approximates a circle.

Figure 9:
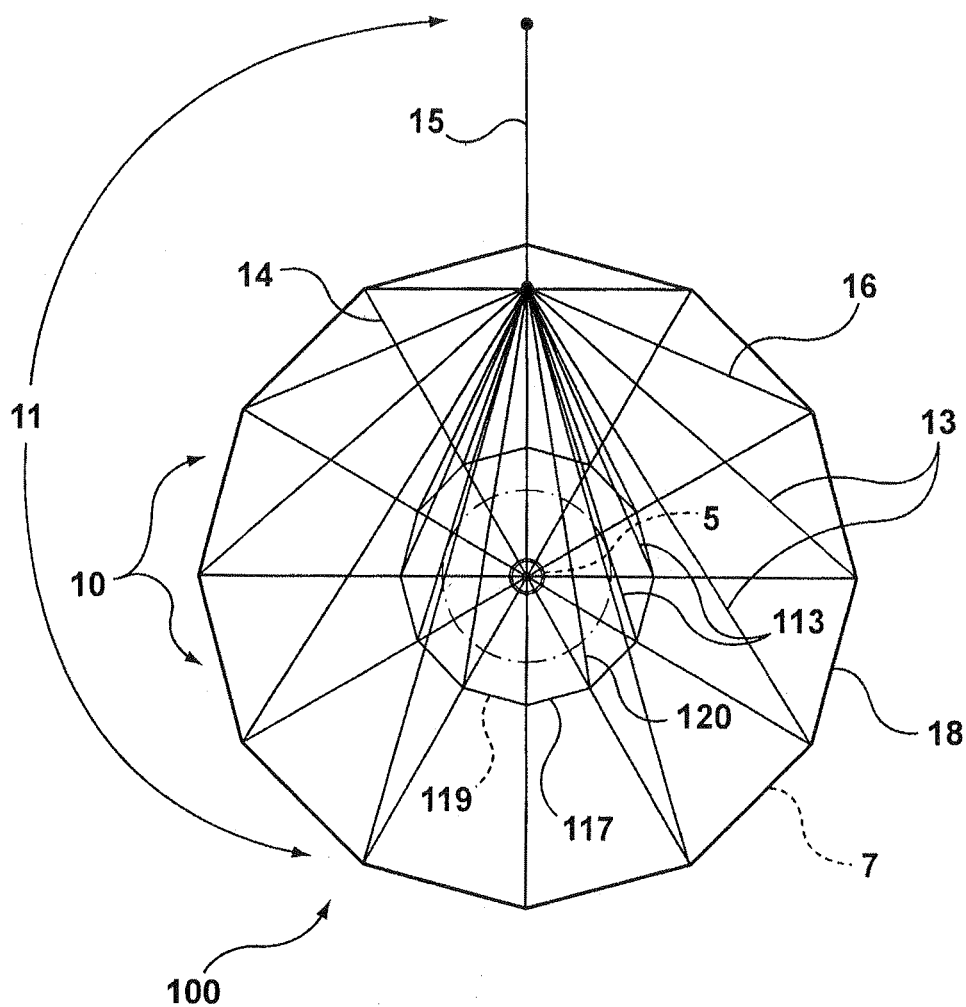
FIG. 9 is a top perspective view showing a further example of a tow assembly according to further example embodiments of the invention.

FIG. 9 shows a tow assembly 100 according to another example embodiment of the invention. The tow assembly 100 is similar to the tow assembly described above with reference to FIGS. 1 to 8*b*, with the exception that the tow assembly 100 also includes a tubular bucking coil frame 117 supporting a bucking coil 119 in order to cancel out in the vicinity of the receiver coil 5 the effects of the effects of the primary field generated by the transmitter coil 7. In one example embodiment, the bucking coil frame 117 is substantially identical in construction and mechanical operation to the transmitter coil frame 10, but smaller. Thus, the bucking coil frame 117 is also formed from a plurality of serially connected frame sections forming a loop, and having articulating joints at a plurality of locations about a circumference thereof enabling the bucking coil frame to at least partially bend at the articulating joints. In an example embodiment the bucking coil is supported by a support rope assembly 113 includes ropes 127 that each have a lower end attached to a respective pick-up point on the circumference of the transmitter coil frame 117 and an upper end attached to the lower end of tow rope attachment suspension cable 15. In some example embodiments the bucking coil support ropes 127 are attached at a lower point to the tow cable 15 than the transmitter coil support ropes 16. The bucking coil frame 117 may for example be about ¼ the diameter of the transmitter coil frame 10, and may also be connected at respective corners to the radially extending ropes 14 such that the bucking coil 119 is held in substantially concentric alignment with the transmitter coil 7 and the receiver coil 5. A suspension net similar to that shown in FIGS. 8A and 8B can alternatively be used to support the bucking coil frame.

What is claimed is:

1. A tow assembly for an airborne electromagnetic surveying system, comprising:

a polygonal transmitter coil frame supporting a transmitter coil, the transmitter coil frame having straight frame sections that are joined at corners of the transmitter coil frame by joints permitting the straight frame sections to at least partially rotate about long axes thereof enabling the shape of the transmitter coil frame to adjust during landing contact with a ground surface to reduce stress on transmitter coil frame; and a suspension assembly for towing the transmitter coil frame behind an aircraft, the suspension assembly supporting the transmitter coil frame at a plurality of spaced apart locations.

2. The tow assembly of claim 1 wherein the transmitter coil frame straight frame sections are tubular sections, the transmitter coil extending inside the tubular sections.

3. The tow assembly of claim 1 including a plurality of connecting ropes that each extend outward from a common hub to a respective location on the transmitter coil frame.

4. The tow assembly of claim 1 wherein the suspension assembly has a shorter vertical height at a leading side thereof than a trailing side thereof thereby supporting the transmitter coil frame in a substantially horizontal position at a desired flight speed.

5. The tow assembly of claim 1 wherein the suspension assembly comprises a tow rope for attachment to the aircraft and a plurality of suspension ropes, the suspension ropes each having an upper end attached to an end of the tow rope and a lower end connected to a respective location of the transmitter coil frame.

6. The tow assembly of claim 5 wherein the lengths of the suspension ropes attached to a trailing portion of the transmitter coil frame are longer than the suspension ropes attached to a leading portion of the transmitter coil frame.

7. The tow assembly of claim 1 wherein the joints at the corners of the transmitter coil frame are lubricated.

8. The tow assembly of claim 1 wherein the joints at the corners of the transmitter coil frame are each formed by a male portion of one transmitter frame sections received within a corresponding female portion of another transmitter frame section.

9. The tow assembly of claim 1, comprising:

a receiver coil and a bucking coil located in a common plane and concentric with the transmitter coil, the receiver coil having a smaller diameter than the bucking coil, the bucking coil having a smaller diameter than the transmitter coil and being electrically connected to and having an opposite current flow direction than the transmitter coil, the bucking coil being supported by a polygonal bucking coil frame, the bucking coil frame having straight frame sections that are joined at corners of the bucking coil frame by joints permitting the straight frame sections of the bucking coil frame to at least partially rotate about long axes thereof enabling the shape of the bucking coil frame to adjust during landing contact with the ground surface to reduce stress on the bucking coil frame.

* * * * *